Sept. 19, 1967    C. P. BLANKENSHIP ET AL    3,342,055
PROTECTIVE DEVICE FOR MACHINE AND METALWORKING TOOLS
Filed Dec. 29, 1964
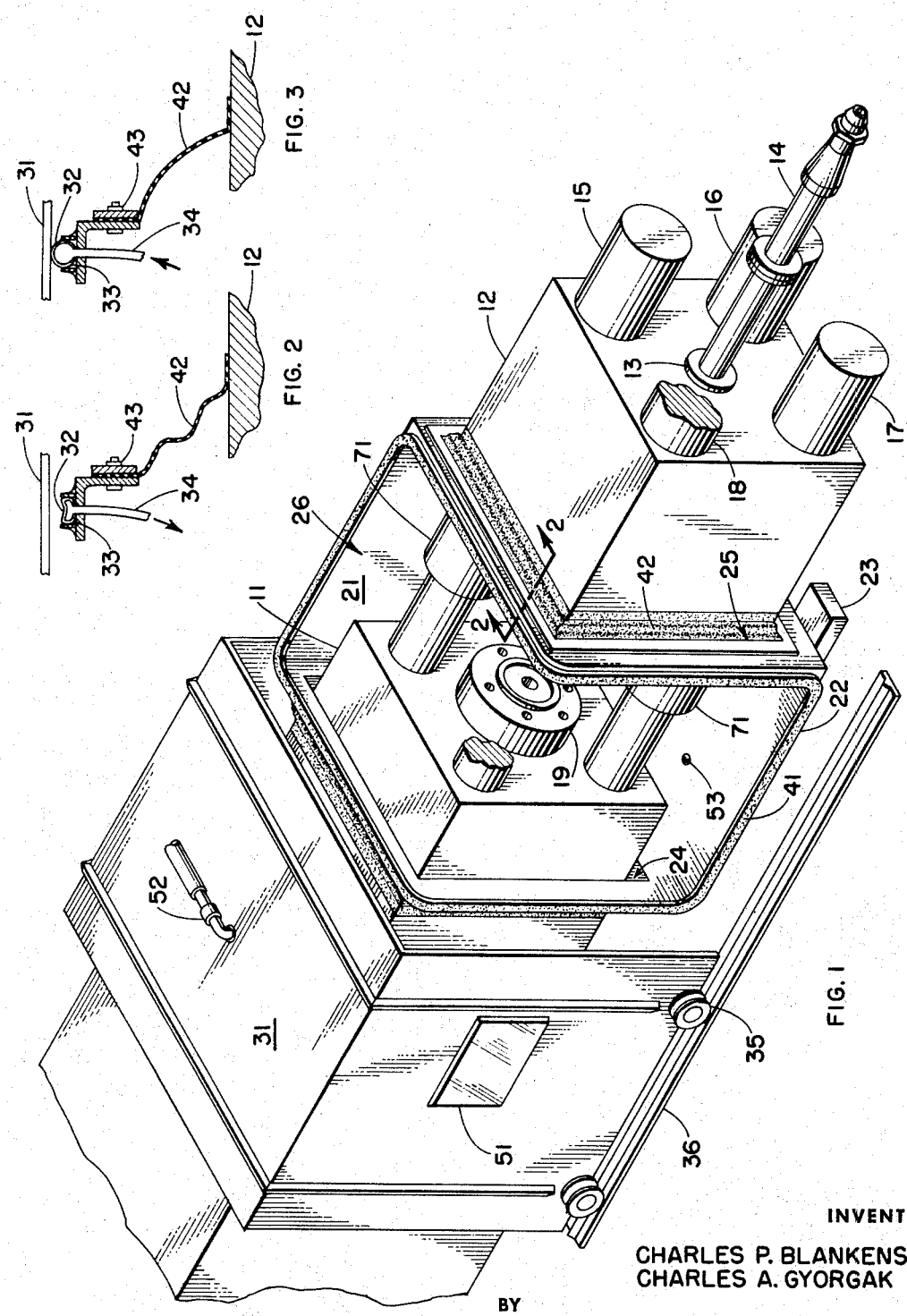
INVENTORS
CHARLES P. BLANKENSHIP
CHARLES A. GYORGAK
BY
ATTORNEYS

United States Patent Office 3,342,055
Patented Sept. 19, 1967

3,342,055
PROTECTIVE DEVICE FOR MACHINE AND METALWORKING TOOLS
Charles P. Blankenship, Rocky River, and Charles A. Gyorgak, Middleburg Heights, Ohio, assignors to the United States of America as represented by the Administrator of the National Aeronautics and Space Administration
Filed Dec. 29, 1964, Ser. No. 422,098
7 Claims. (Cl. 72—253)

ABSTRACT OF THE DISCLOSURE

An elongated pressure chamber open at each end to allow metalworking members to extend into its interior, each end opening having a flexible flange disposed between the metalworking member and the opening. An access opening surrounded by a peripheral groove is provided in the side and top of the chamber and a closed loop of inflatable rubber tubing is disposed in the groove. A downwardly opening cover of U-shaped cross section and provided with wheels along the edges of the open end is disposed over the chamber. The cover may be moved longitudinally to uncover the access opening. When the cover is in position over the opening, the chamber is sealed if the rubber tubing is inflated. The chamber may then be pressurized with an inert gas.

---

The invention described herein may be manufactured and used by or for the Government of the United States of America for governmental purposes without the payment of any royalties thereon or therefor.

The instant invention relates to protective devices and more particularly to a device for providing a protective atmosphere around a work piece in a machine or metalworking tool while it is being worked on.

During various types of metalworking operations such as forging or extruding or closed die compaction, wherein heavy duty type machines are involved, or other various types of machining operations, the work pieces are often subjected to extremely high temperatures. At these elevated temperatures, the work piece is often susceptible to excessive oxidation. It is therefore necessary and desirable to provide for some method or apparatus whereby oxidation that may occur as said higher temperatures can either be eliminated or reduced.

It has been proposed to work the material in a large room completely filled with some type of inert gas. However, in this situation, the work must either be accomplished by remote control of by men dressed in cumbersome clothing and provided with special apparatus. This would require a large volume of inert gas and would result in an operation that is prohibitively expensive.

It has also been proposed to maintain a flowing inert gas cover over the work piece. However, the protection derived from this enveloping gas would appear to be negligible insofar as there would be considerable dilution of the cover gas with the atmosphere.

If the machine tool involved was one of relatively small size, it has been proposed to enclose the entire tool within a vacuum chamber. However, this method would not be particularly well suited to heavy duty type tools, such as an extrusion press, having very large movable members.

It is therefore an object of the present invention to provide for a protective device for use with a heavy duty type machine tool.

It is another object of the present invention to provide for a protective device for use with an extrusion press.

It is still another object of the invention to provide for a device for protecting a work piece from excessive oxidation or from other atmospheric contaminants at extremely high temperatures.

It is still another object of the present invention to provide for a device which can provide a protective atmosphere over an area that changes in size.

It is another object of the present invention to provid for a closed chamber around a pair of machine members at least one of which is movable.

It is still another object of the present invention to provide for a protective device for use with a heavy duty type machine tool that can be easily disassembled.

It is yet still another object of the invention to provide for a protective device for use with an extrusion press capable of withstanding the movements and impact shocks to which it is subjected during an extrusion operation.

It is another object of the present invention to provide for a protective device for use with an extrusion press that allows freedom of movement of the press and can be used when the work piece attains temperatures up to and higher than 4000° F.

It is another object of the present invention to provide for a new and novel method of protecting a workpiece from atmospheric contaminants while it is being worked on.

To attain these and other objects, the instant invention contemplates a new and novel protective device in the form of a chamber that is disposed between the ram and the bolster block of an extrusion press and which forms in effect a closed area over a portion of the press. Means are provided for introducing an inert gas into the chamber thus formed. The instant invention also contemplates a chamber that is flexible so that it may be secured to the ram and the bolster block and provides for as close to a gastight seal as possible when the ram and bolster block are in movement.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a perspective view of the main portion of an extrusion press employing the protective device of the present invention;

FIG. 2 is a view partly in section of the press and protective device taken along the line 2—2 of FIG. 1 when the pressure inside the device is atmospheric;

FIG. 3 is a view partly in section showing the portion of the press and chamber shown in FIG. 2 when the pressure inside the device is above atmospheric.

The protective device of this invention may be adapted for use upon a variety of different types of machine tools or metalworking equipment. However, for sake of brevity, the protective device is illustrated only with respect to an extrusion press. However, it is to be understood that the present invention can be applied for use on other types of machine tools in an appropriate manner.

Referring now to the drawings wherein like reference characters designate like or corresponding parts through the several views, there is shown in FIG. 1 a machine tool of the type known in the trade as an extrusion press.

The extrusion press includes a ram 11 and a bolster block 12. Columns 15, 16, 17, and 18 extend through and are movable relative to ram 11 and are rigidly secured to bolster block 12. In operation, a work piece (not shown) is mounted between the punch holder 19, which is secured to the ram 11, and the bolster block 12. Ram 11 and bolster block 12 are simultaneously moved towards each other developing energies that can be as high as 450,000 foot-pounds. The work piece is subsequently expelled through an opening 13 in the bolster block 12 at velocities as high as 3000 miles per hour. In the illustrated drawings, the opening 13 in the bolster block 12 is shown covered with a seal or plug member 14. However, during an extruding operation, the plug member 14 is removed and opening 13 sealed off by means of masking tape or other similar materials.

To prevent excessive tool deformation or breakage, the extrusion press shown is provided with a plurality of soft, easily deformed metal members 71 in the form of tubes or sleeves which are positioned over the columns 15, 16, 17, and 18. The shims 71 serve to absorb excessive strains. In addition to the tubular members 71 which are of a mild steel, there is also provided for a plurality of steel shims (not shown) which are also mounted on the columns 15, 16, 17, and 18.

In order to provide for a protective atmosphere around a work piece during the operation of the machine, the work piece is surrounded by a novel, protective, flexible casing or pressure chamber 21. Said elongated casing or chamber 21 provides for a gaslight seal around the area between the ram and the bolster block enclosing thereby the work piece from the surrounding atmosphere. The casing or chamber 21 comprises a housing or frame member 22 and a cover member 31. The housing 22 is rigidly mounted on blocks 23 which are secured to the floor where the machine is located. The housing 22 is hollow and is provided with an opening at either end 24, 25 and an opening along the mid-portion 26. End opening 24 is shaped to conform to the bolster block 12 and end opening 25 is shaped to conform to the ram 11. Housing 22 is positioned relative to the extrusion press so as to close off the area between the ram 11 and the bolster block 12. In the embodiment shown, the housing 22 is sized so that the ram 11 extends partially through end opening 24 and the bolster block extends through end opening 25 in a telescoping arrangement with suitable clearance so as to allow freedom of movement during the operation of the press.

Open end 24 is connected to the ram 11 by means of a flexible member 41. Open end 25 is similarly connected to the bolster block by means of a flexible member 42. As can be seen from FIG. 2 the flexible member 42 is rigidly secured to the housing 22 adjacent the opening 25 forming thereby a peripheral flange. Said flange may be secured by means of a bolt 43, however, other types of mechanical means or cementing means could be employed to secure the flexible member 42 to the housing 22. In the embodiment shown, the flange is in the form of a continuous annular member, however, said flange 42 could be in the form of a plurality of sections. The outermost end of the flexible flange member 42 is subsequently secured by means of cement or other suitable securing means to the bolster block 12. In the embodiment shown, the flexible member 42 is neoprene rubber. However, any type of flange that is either resilient, elastomeric, extensible, deformable or expansible and having low permeability could be employed.

By means of these flexible flange members 41, 42 which are connected to the ram 11 and bolster block 12 respectively, a continuous seal is provided for between the movable ram 11, the stationary housing 22 and the movable bolster block 12.

The flexible or expansible portion of the chamber need not be in the form of a peripheral flange. Said chamber could be rigid at the end portions and contain a flexible or expansible mid-portion. Said flexible member could also be in the form of a bellows at the ends or at the mid-portion.

Complete sealing off of the pressure chamber 21, that is sealing off of the mid-portion 26 of the housing 22, is provided for by means of a movable cover plate 31. In the embodiment shown, the cover plate 31 is in an extended or open position. When the cover plate 31 is in a closed position, said cover plate 31 telescopingly surrounds the housing 22 with a slight clearance of approximately one fourth of an inch between it and said housing 22. An airtight seal between the cover assembly 31 and the housing 22 is provided for by means of a closed loop of rubber tubing 32 (see FIGS. 2 and 3) which is mounted within a peripheral groove 33 along the opening 26. Inlet means 34 are provided for inflating the rubber tubing 32. Said tubing 32 is secured to the peripheral groove 33 by any suitable means such as cement. When the tubing 32 is in an expanded or inflated position, an airtight seal is formed between the cover member 31 and the frame member 21. To aid in moving the cover assembly 31, the cover assembly 31 is mounted on wheels 35 which in turn move along rails 36. A viewing port for 51 may be provided for observing the extruding operation. Inlet means 52 and outlet means 53 are also provided for on the chamber whereby a gas may be introduced thereto for purging said chamber.

In operation, the cover is moved into a closed position. The rubber tubing is then inflated forming thereby an airtight or gastight chamber. The chamber may then be evacuated to eliminate any contaminants within. The chamber is then purged with an inert gas for a period of time such as 30 minutes and brought up to a pressure above that of the atmosphere. During the operation of the machine, the chamber can be either at or above atmospheric pressure. If the extruding operation is carried out at above atmospheric pressure, the rubber tubing can be deflated simultaneously with the actuation of the press. In order to prevent excessive pressure build-up on the various sealing members (if this latter method is employed), the timing should be such that the atmospheric oxygen cannot come into contact with the work piece until the forging or extruding operation has been completed.

Although not shown, a gastight seal is provided for around the columns 14, 16, 17, and 18 by means of rubber seals.

In FIG. 2 is shown in detail the rubber tubing and flexible member section when the chamber is unsealed and at atmospheric pressure; and in FIG. 3 is shown the rubber tubing and flexible member when the chamber is sealed off at above atmospheric pressure.

Obviously, many modifications and variations of the present invention are possible in light of the above teaching. It is therefore to be understood that within the scope of the appended claims, the invention may be practiced otherwise and as specifically described.

We claim:

1. An improved extrusion press comprising a ram, a bolster block spaced apart therefrom, and an elongated pressure chamber disposed between said ram and said bolster block and having an opening at each end in commuciation with said ram and said bolster block, a first flexible member sealingly interposed between said ram and the opening at one end of said chamber externally of said chamber, a second flexible member sealing interposed between said bolster block and the opening at the other end of the chamber externally of said chamber, whereby said ram and said bolster block are free to move relative to said chamber while a work piece inserted within the chamber is protected from the atmosphere while it is being extruded.

2. Apparatus according to claim 1 wherein said elongated pressure chamber includes a housing, said housing having an access opening, a cover for said access opening, means for positioning said cover in spaced relationship over said access opening, said housing further having a peripheral groove around said access opening, a closed loop of rubber tubing mounted within said peripheral groove, pressurizing means connected to said rubber tubing to expand the same into sealing relationship with said cover.

3. For use with an extrusion press in forming a protective atmosphere, a pressure chamber comprising a flexible housing having a pair of end openings, means for sealingly attaching said end openings to respective movable members of said press, an access opening along a mid-portion, said opening having a peripheral groove, a closed loop of rubber tubing mounted within the groove, and a removable cover.

4. Apparatus according to claim 3, said housing including a rigid mid-section and a flexible end section, said end section including a flange of deformable material.

5. Apparatus according to claim 1 wherein said first and second flexible members each comprise a peripheral flange of flexible material disposed around respective ones of said end openings.

6. Apparatus according to claim 5 wherein said peripheral flange of flexible material is provided with longitudinally extending corrugations.

7. The apparatus of claim 2 wherein there is provided means for pressurizing said chamber, and means for establishing communication between the chamber and the interior of said rubber tubing whereby pressurization of said chamber causes pressurization of the interior of said rubber tubing to seal the space between said cover and said chamber.

References Cited

UNITED STATES PATENTS

| 2,753,995 | 7/1956 | Tennant | 72—38 |
| 3,164,253 | 1/1965 | Muller | 72—38 |
| 3,194,466 | 7/1965 | Davis | 228—42 |

FOREIGN PATENTS 922,630   2/1947   France.

CHARLES W. LANHAM, *Primary Examiner.*

K. C. DECKER, *Assistant Examiner.*